No. 727,506. Patented May 5, 1903.

UNITED STATES PATENT OFFICE.

FREDERICK JOHN WARREN, OF NEWTON, MASSACHUSETTS.

ASPHALTUM AND ITS MANUFACTURE.

SPECIFICATION forming part of Letters Patent No. 727,506, dated May 5, 1903.

Application filed May 16, 1901. Serial No. 60,454. (No specimens.)

*To all whom it may concern:*

Be it known that I, FREDERICK JOHN WARREN, a citizen of the United States, residing at Newton, in the county of Middlesex and Commonwealth of Massachusetts, have invented or discovered certain new and useful Improvements in Asphaltum Compositions and Their Manufacture, of which the following is a full, clear, and exact description.

It is desirous for various reasons to provide asphalt compounds for paving and the like when employed in exposed positions or when it is desired that they should have long or continuous life with properties which they do not now possess, and this quality of resistance to the weather and of continued life I have ascertained is provided by the treatment of asphalts with an oil of a different character from that which has heretofore been employed. The oils which have generally been used in the manufacture of asphalt cements and compositions have been oils distilled from petroleum having a paraffin base or the residuum of said oils. Such oils, while serving very well in asphalt cements and compositions for some purposes, do not produce an asphalt or composition which will be practically indestructible upon exposure. This is due to the fact that such oils are either of a volatile nature or of such a character as not to form a perfect solvent for the bitumen in the asphalt, and the asphalt cement is therefore subject to rapid change by evaporation or disintegration or by decomposition on exposure to elements, due to the volatile nature of the fluid or to the instability of the mechanical mixture of the fluid and the asphalt, and will leave the cement or composition in a condition of ready disintegration from exposure and wear.

My invention contemplates in the manufacture of asphalt cements or compositions the employment of an oil which does not volatilize any more rapidly than heavy petroleum residuums and forms a perfect union or solvent with the asphalt itself, and therefore always remains in the asphalt cement, composition, or pavement as an existing ingredient of practically the same force and effect as when first used, and it acts to preserve the cement or composition from attacks of the weather, oxidation, or disintegration. The oil which I employ is that which is obtained by distillation from the liquid petroleums, like those of Texas and southern California, as distinguished from those petroleums which have a paraffin base, and is obtained by first removing the lighter oils, which are volatile at the temperature at which the asphalt cement is worked, and then distilling off the heavier oils, discarding the hard resinous asphaltic base which remains after the useful oils are taken off. These hydrocarbons or petroleums having asphalt bases are known in commerce by different names, but have only recently been used to any considerable extent in the arts. By distillation of these hydrocarbons having asphalt bases there is obtained an oil which is not of a volatile character, but which will readily unite or combine with any form of asphalt for the production of an asphalt cement or composition, and when so combined with asphalt there is produced an asphalt cement or composition which will have all the desirable properties of the asphalt cements and compositions combined by volatile oils or when combined with heavy paraffin-oils and also other properties which they do not possess and which are essential to the long life above mentioned.

In manufacturing the cement or composition the proportions of the asphalt to the oil derived from petroleum of the character specified, which I will call "asphalt-oil," to distinguish it from the volatile oil or other oils of a different nature from the oil contained in natural asphalt, are variable according to the use of the resulting cement or composition, its time and temperature of use, and other condition. It also depends upon the quality and kind of asphalt employed and upon the quality or sized grain of the mineral matter mixed therewith and upon the quality of the asphalt-oil itself. Ordinarily twenty pounds of heavy petroleum residuum, 20° Baumé, and one hundred pounds of refined Trinidad Lake asphalt will produce a cement of the same softness at 73° Fahrenheit as seventeen pounds of my asphalt-oil and one hundred pounds of refined Trinidad Lake asphalt, and such a cement would be of about the same softness at 78° Fahrenheit as eight pounds of coal-tar light oil mixed with one hundred pounds of refined Trinidad Lake asphalt. For floors the cement used is generally of the consistency produced by mixing ten pounds of petroleum residuum, 20° Baumé, with one hundred pounds of refined Trinidad Lake asphalt, and for street-pavements the asphalt cement used is generally of the consistency obtained by mixing eighteen pounds of petroleum residuum with one hundred pounds of refined Trinidad Lake asphalt, and for the various uses the asphalt cements as heretofore used have been made of a flexibility equal to that produced by the addition of from eight pounds to fifty pounds of heavy petroleum residuum with one hundred pounds of refined Trinidad Lake asphalt, and the same consistency would be obtained by the use of from seven per cent. to forty-two per cent. of my asphalt-oil. From what has been said, however, it will be seen that these proportions are so variable, because of difference in condition and use, that it is not possible to give an invariable formula that will answer all purposes.

It is desirable that the asphalt and asphalt-oil should be combined under heat, and ordinarily a temperature of not over 300° will answer for thus combining them. In some instances the combination of asphalt and asphalt-oil will be produced in the distillation of oil from hydrocarbons having an asphalt base, and such asphalt and asphalt-oil product or residuum may be employed in the manufacture of a pavement upon the application of heat without being combined with other asphalt-oil, or additional asphalt-oil may be added to it, if desired or necessary. In the manufacture of a pavement the asphalt cement or composition comprising the asphalt and an asphalt-oil combined together and heated is thoroughly intermingled with the mineral particles or pieces which form the base of the pavement, and such pavement may be constructed in any of the ways now common in the art, and the product—viz., the completed pavement—will have longer life with the use of my asphaltic oil with the asphalt, due to the fact that the oil of the cement or composition does not evaporate, oxidize, or disintegrate when exposed to the elements.

I have referred to the employment of my improved asphalt cement or composition in the manufacture of pavements. This is for the purpose of illustration and not for the purpose of limiting its range, for the improvement is equally applicable for all the purposes or uses to which asphalt cements or compositions are put, whether in the line of street or sidewalk pavements, walks, floorings, roofings, or any other purposes and with whatever ingredients other than mineral matter it may be combined and in whatever way it may be combined with it or them.

Having thus fully described my invention, I claim and desire to secure by Letters Patent of the United States—

1. An asphaltum for paving and other uses consisting of a mixture of such asphaltums as are hard and have great wearing qualities with a flux of heavy permanent hydrocarbon oil from another asphaltum.

2. An asphaltum for paving and other uses consisting of hard and durable natural asphaltum fluxed with the heaviest and most permanent of the hydrocarbon oils obtained from another asphaltum.

3. An asphaltum for paving and other uses containing as a flux the heaviest and most permanent of the hydrocarbon oils obtained from another asphaltum.

4. The use as an asphalt flux of the heaviest and most permanent of the hydrocarbon oils having an asphalt base.

5. The method of producing an asphaltum of predetermined characteristics consisting in so treating one asphaltum as to remove its lighter and less valuable hydrocarbons and also its asphaltene base, and then applying the remaining heavy hydrocarbon oils in sufficient quantities to such hard and durable asphalts as may be desirable.

6. An asphalt for paving or other purposes consisting of asphalt-oils in combination with a naturally hard undesiccated asphaltum.

7. An asphalt for paving or other purposes consisting of asphalt-oils in combination with an undesiccated asphaltum.

8. The method of producing a material for paving or other suitable purposes consisting in desiccating an asphaltum and collecting the asphalt-oils of such desiccation and fluxing an undesiccated asphaltum in such oils.

9. The combination of relatively pure asphalt and a flux of such portion of the oils, present in hydrocarbons having an asphaltic base, as holds such base in solution after all other oils have been extracted.

10. A relatively pure hard asphalt in combination with such portion of the heavy permanent oils of some soft or otherwise unsuitable hydrocarbons having an asphaltic base, as holds such base in solution after all other oils have been extracted.

11. The method of producing an asphalt of great permanence suitable for paving, &c., consisting in removing from a soft or impure asphalt, or from such petroleums as have asphaltic bases, all oils except the heavy permanent oil in which said base last remains in solution, and then removing said last heavy oil and mixing said oil with the proper asphalt.

12. The method of producing an asphalt of great enduring qualities consisting in obtaining from an asphaltum its heaviest and most permanent hydrocarbon oils and then mixing such oils in suitable quantities with an asphaltum suitable for the purposes required.

FREDERICK JOHN WARREN.

Witnesses:
F. F. RAYMOND, 2d,
J. M. DOLAN.